(12) United States Patent
Svensson (10) Patent No.: US 7,310,990 B2
(45) Date of Patent: Dec. 25, 2007

(54) HIGH-PRESSURE PRESS

(75) Inventor: Lennart Svensson, Västerås (SE)

(73) Assignee: Avure Technologies AB, Vasteras (SE)

( * ) Notice: Subject to any disclaimer, the term of this patent is extended or adjusted under 35 U.S.C. 154(b) by 305 days.

(21) Appl. No.: 10/479,682

(22) PCT Filed: Jul. 1, 2002

(86) PCT No.: PCT/SE02/01297

§ 371 (c)(1),
(2), (4) Date: Jun. 21, 2004

(87) PCT Pub. No.: WO03/004144

PCT Pub. Date: Jan. 16, 2003

(65) Prior Publication Data

US 2004/0250714 A1    Dec. 16, 2004

(30) Foreign Application Priority Data

Jul. 4, 2001    (SE) .................................. 0102392

(51) Int. Cl.
*B21J 13/04* (2006.01)
*B01J 3/04* (2006.01)
*B30B 15/28* (2006.01)

(52) U.S. Cl. ............................. 72/455; 72/20.1; 72/60; 100/35; 100/46; 100/99; 100/258 A (58) Field of Classification Search ................ 72/454, 72/455, 60, 456; 100/214, 35, 99, 53
See application file for complete search history.

(56) References Cited

U.S. PATENT DOCUMENTS

| 3,411,345 A | 11/1968 | Wintriss | .................... | 73/88 |
|---|---|---|---|---|
| 3,877,285 A * | 4/1975 | Trolle | .................... | 72/455 |
| 4,064,734 A * | 12/1977 | Pahnke | .................... | 72/455 |
| 4,274,282 A * | 6/1981 | Budraitis et al. | .................... | 100/99 |
| 4,289,022 A * | 9/1981 | Dybel et al. | .................... | 100/99 |
| 4,345,890 A * | 8/1982 | Hemmi et al. | .................... | 100/214 |
| 5,440,499 A | 8/1995 | Rasmussen | .................... | 364/551.01 |
| 5,857,368 A * | 1/1999 | Grunes et al. | .................... | 72/54 |
| 6,250,216 B1 * | 6/2001 | Bornhorst | .................... | 72/455 |

FOREIGN PATENT DOCUMENTS

| DE | 838 597 | 5/1952 |
|---|---|---|
| DE | 40 35 840 C1 | 4/1992 |
| DE | 197 10 499 A1 | 10/1997 |
| EP | 0 941 833 A1 | 9/1999 |
| EP | 1 177 885 A1 | 2/2002 |
| JP | 6-55300 | 3/1994 |

* cited by examiner

*Primary Examiner*—David B Jones
(74) *Attorney, Agent, or Firm*—Harness, Dickey & Pierce, P.L.C.

(57) ABSTRACT

A high-pressure press includes a pressure vessel surrounded by a force-absorbing press frame. The high-pressure press also includes a detection structure for detecting changes in length of at least one column comprised in the press frame, the changes in length depending on the pressure inside the pressure vessel. The detection structure includes a limit switch, which is adapted to detect if the change in length of the column has reached a threshold value and, in that case, interrupt a pressing operation in progress and reduce the pressure inside the pressure vessel.

18 Claims, 5 Drawing Sheets

HIGH-PRESSURE PRESS

BACKGROUND OF THE INVENTION

1. Field of the Invention

The present invention relates to a high-pressure press of the type which comprises a pressure vessel surrounded by a force-absorbing press frame. The invention also relates to a method for pressure-related monitoring of such a high-pressure press and to use of one or more rod-shaped members in connection with a high-pressure press.

2. Description of the Related Art

High-pressure presses of the type stated by way of introduction are used, among other things, when forming sheet-shaped blanks, for example, sheets of steel or aluminium, for short series products within the aircraft industry and the motor industry. Another field in which this type of high-pressure presses is used is wood compaction when a workpiece of wood is exposed to high pressure, either in a forming tool or on its own. Reasons for compacting wood are, for example, that it is desirable to increase the hardness of the wood, decrease the moisture content or to obtain a phase in pressure impregnation. Yet another range of application is within the food industry in which high-pressure presses can be used to prolong the shelf life of various food and beverage products.

The working pressure in a high-pressure press can typically amount to 12000 bar. For reasons of, for instance, security, the high-pressure press is usually provided with a pressure gauge which has a sensor in the pressure vessel for measuring the pressure in the press. It is important that a pressing operation in progress can be interrupted and the pressure reduced if the pressure in the press happens to exceed by accident a permissible maximum pressure. However, the traditional pressure gauge provides only relatively little information regarding the conditions in the press. Although the accuracy of the pressure gauge is guaranteed by its supplier, it has been found to be insufficient to entirely rely on this single measuring component for such an important function.

BRIEF SUMMARY OF THE INVENTION

The invention is based on the understanding that by means of relatively simple structures satisfactory accuracy can be obtained in connection with pressure-related monitoring of a high-pressure press, which comprises a pressure vessel with a surrounding force-absorbing press frame by the deformations of the press frame being detected during a pressing operation in progress, the deformations being related to the pressure inside the pressure vessel.

Thus, the traditional way of arranging a pressure gauge with a sensor in the pressure vessel is obviated by the detection being carried out according to the invention on the outside of the press construction.

According to one aspect of the invention, a high-pressure press is thus provided, which comprises detection means which are adapted to detect changes in length of a column included in the press frame, the changes in length being dependent on the pressure inside the pressure vessel. The detection means comprise a limit switch which is adapted to detect if the change in length of the column has reached a threshold value, preferably corresponding to a certain pressure inside the pressure vessel and, if said threshold value has been reached, to interrupt a pressing operation in progress and reduce the pressure inside the pressure vessel.

Embodiments of the invention allow easy and efficient monitoring of the high-pressure press, in particular since the change in length of the column during a pressing operation in progress is proportional to the pressure change inside the pressure vessel.

According to one embodiment of the invention, a device suitable for the purpose is provided, comprising an unloaded member having a constant length, the member being arranged parallel to and adjacent to said column, the change in length of the column relative to said member being detected. Conveniently, this is brought about in such a manner that the position of a first portion of said member is substantially constant relative to the position of a first portion of the column, whereas the position of a second portion of the column is freely movable in the longitudinal direction relative to the position of a second portion of said member.

As said member adjacent to the column, it is preferred to use an elongate, preferably rod-shaped member, which extends along the column. One end of the rod-shaped member is then suitably adapted to follow one end of the column, whereas the position of the other end of the rod-shaped member relative to the other end of the column will vary when the pressure changes inside the pressure vessel. In the rest of this description, the term rod-shaped member will be used, but it should be understood that also other shapes of the member are possible.

The rod-shaped member is thus arranged on a column, which is comprised in the press frame, and is suitably mounted on a side of the column that is easily accessible. Consequently, the side of the column facing the pressure vessel is preferably avoided. In the case when the force-absorbing press frame is prestressed (such as with a wire that has been wound round the press frame) to induce a compressing prestress acting in the plane of the press frame, the rod-shaped member is suitably arranged at a column surface without the prestressing structure.

According to another embodiment of the invention, the temperature in the rod-shaped member is changed in the same way as the press, also in connection with fast changes in temperature. Such changes may, for example, be due to the fact that the solar radiation is strong or that a cold wind blows on the press. By using the change in temperature of the column and arranging the rod-shaped member in such a manner that temperature equalization is provided between the column and the rod-shaped member, many advantages are obtained. One advantage is that the satisfactory temperature uniformity between the column and said member eliminates the need of temperature compensation. Both the details will obtain the same temperature and, owing to this fact, the effect of the heat expansion is eliminated and the accuracy will be satisfactory. The detected value will thus be a direct measure of the force in the press frame.

In order to obtain satisfactory temperature uniformity between the column and the rod-shaped member, the latter is preferably of equal value as regards material having an equivalent coefficient of thermal expansion (at least in their common longitudinal direction). The column and the member suitably have the same surface treatment, for example, being painted with the same color.

In order to provide satisfactory temperature transfer from the column, the rod-shaped member preferably abuts against the column. However, it has turned out that excellent temperature uniformity is obtained even if only one or a few limited portions of the rod-shaped member are in contact with the column. Conveniently, the rod-shaped member has a smooth and plane contact surface against the column.

According to another embodiment of the invention, the rod-shaped member has a length that corresponds to the length of the column. This makes it possible to easily arrange a detection structure on one end of the rod-shaped member. The accuracy of the measurements becomes very satisfactory, and relatively uncomplicated gauges can be used in the detection structure. However, it should be understood that detection means can be arranged also at other locations than said end, and even detached from the unloaded (e.g. rod-shaped) member, for example, when detecting by means of laser.

As already mentioned, according to an embodiment of the invention, one end of the rod-shaped member is suitably arranged so as to follow one end of the column, whereas the other end of the rod-shaped member is movable relative to the other end of the column. During a pressing operation in progress, the distance between the other end of the column and the other end of the rod-shaped member will thus change, which is detected with the aid of a detection structure. The long rod-shaped member makes it possible to arrange the detection structure on the other end of the rod-shaped member, which is preferred. Alternatively, the detection structure can, however, be arranged on the column or be independent from these two parts.

In order to prevent the press from working at too high a pressure, the detection means may comprise a structure that detects whether the change in length of the column has reached a threshold value corresponding to a certain pressure inside the press. For a typical high-pressure press, a change in length of 0.1 mm can correspond to a change in pressure of 150 bar. If it is desirable, for example, to interrupt a pressing operation when the pressure in the press amounts to 6600 bar, the threshold value is thus set to a change in length of 4.4 mm. If the detection structure detects that the set threshold value has been reached, the pressing operation is interrupted and the pressure released.

According to an embodiment of the invention, the detection structure comprises a limit switch which is connected to hardware, i.e. the switch is independent of electrical equipment and opens a circuit which directly releases the pressure in the press and possibly opens a circuit which interrupts the supply of pressure medium, if any. The switch is arranged in a suitable manner on one end of the rod-shaped member and can advantageously be formed as a rocker arm having a lever. When the column due to its change in length strikes against the lever, reinforcement of the movement takes place at the other end of the lever, which end then performs opening of the circuit and discharge of the pressure in the press.

Preferably, the system of security is designed in such a manner that a release valve is controlled by means of a signal line, while the voltage to the motor which is connected to the pump arrangement is controlled by another signal line. In normal operation, signaling takes place via both signal lines. If the threshold value is reached, two contacts will thus preferably be broken, whereby the signaling ceases, thus preventing further pressure accumulation in the pressure vessel and the release valve being opened so that the pressure is released from the pressure vessel.

The position of the release valve may be controlled by means of pneumatic pressure. If the pneumatic pressure or air pressure disappears, the release valve is opened. The signal that controls the release valve thus suitably affects a device, which may comprise another valve, which in its turn supplies air pressure to the release valve or releases air pressure from the release valve. Naturally, alternatives to a pneumatic release valve are conceivable, for example hydraulic type release valves.

The system of security having the rocker arm is mechanically compelling, i.e., for example, if play or high friction arises between the rod-shaped member and the column, the opening of the circuit will be activated automatically at a lower pressure than normal. This is also the case if a spring construction breaks down, that keeps one end (e.g. the lower end) of the rod-shaped member and the column, respectively, at a constant relative distance. Such a spring construction will be described below in the detailed description of the drawings.

The embodiment described above thus offers a system of security which comprises mechanical detection and which at a certain reached threshold value automatically interrupts the pressing operation and releases the pressure from the pressure vessel. It should be understood that other variants are possible within the scope of protection of the appended claims.

This type of detection structure having limit switches or threshold switches can also be arranged for a press having an existing system of security, supplementing a traditional pressure gauge for obtaining an extra system of security.

Apart from the above-mentioned switch for detecting a threshold value, the detection means may also include a device for continuous measuring of the change in length of the column. A length sensor is advantageously used for this purpose and, thus, continuous monitoring of the press and the current pressure therein can be obtained. Of course, different types of length sensors can be used. One example is a length sensor having an electromagnetic coil in which an iron core is movable. The iron core is displaced by the column when the length of the column changes.

Various mechanical solutions have been described above, the column mechanically affecting the detection means in connection with changes in length. However, other solutions can also be used, such as optical detection, acoustic detection, Bluetooth, etc.

According to an advantageous embodiment of the invention, measurements are made in at least yet another position on the press frame. Preferably, apart from arranging a first set comprising a first rod-shaped member with associated first detection means, also a second set comprising a second rod-shaped member with associated second detection means is arranged on the press frame. This multiple detection is used, for example, to determine if the load on the press is even or if there is a lack of balance.

The first set is arranged on one column, while the second set is arranged on another column in such a manner that the first and the second set are arranged diagonally relative to asymmetry axis of the high-pressure press, the symmetry axis being perpendicular to the extension of the columns. In the present application, the term diagonally signifies a direction which does not coincide with the imaginary horizontal or vertical lines that run parallel to said symmetry axis. In other words, the two column sides, on which the respective sets are arranged, face different, preferably opposite, directions. Those skilled in the art will realize that it is possible to arrange several sets of rod-shaped members with associated detection means, such as four sets symmetrically located at one corner each of the press.

Using a high-pressure press fitted with rod-shaped members that are positioned diagonally on the press frame results in many advantages. The average value of the change in length of the two columns can be used to obtain an accurately measured pressure in the press, whereby the value of a possible traditional pressure gauge can be controlled by the obtained measurement result. Another advantage is that it is easy to check that the press frame becomes symmetrically loaded. Thus, the difference in change in length between the columns can be used to measure eccentric load on the press frame. Should the maximum permissible extension of any one of the columns be exceeded and detected by one of the detection means, emergency shutdown of the press is accomplished.

Embodiments of the present invention thus provide a construction which allows easy arrangement on an already available press frame since the press frame per se does not need to be changed in any way. The rod-shaped members of the device are simply positioned on the outside of the press frame of the high-pressure press. This makes it possible to practically monitor various aspects of the pressing operation, relative to the pressure within a high-pressure press.

DETAILED DESCRIPTION OF THE INVENTION

Figure 1:
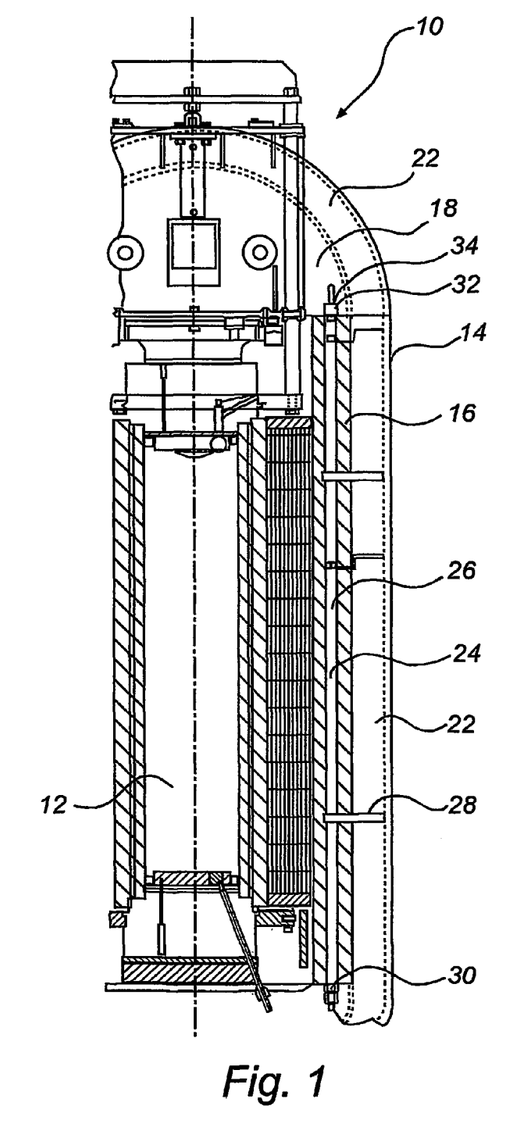
FIG. 1 shows a high-pressure press according to an embodiment of the invention.
Figure 2:
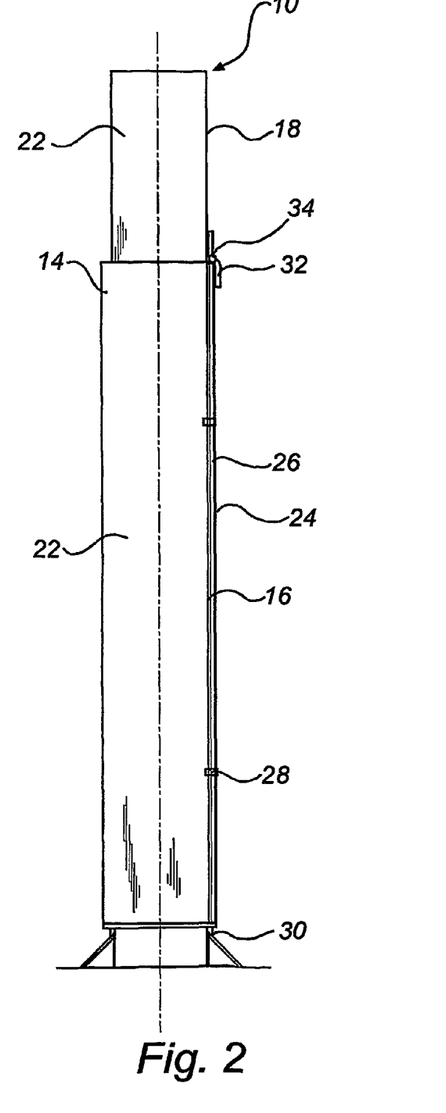
FIG. 2 is a side view of the high-pressure press in FIG. 1.

FIG. 1 is a front view of a high-pressure press 10 according to one embodiment of the invention. FIG. 2 is a side view of the high-pressure press in FIG. 1. The high-pressure press 10 comprises a pressure vessel or a pressure cylinder 12 inside which a high pressure (e.g. up to 15000 bar) is generated for machining a material. The pressure cylinder 12 is surrounded by a press frame 14. For reasons of clarity, the press frame 14 is illustrated in a separate perspective view in FIG. 3, the same reference numerals being used for the corresponding elements in FIG. 1, FIG. 2 and FIG. 3. The press frame 14 comprises two columns 16 which are arranged on one side each of the pressure cylinder 12.

Figure 3:
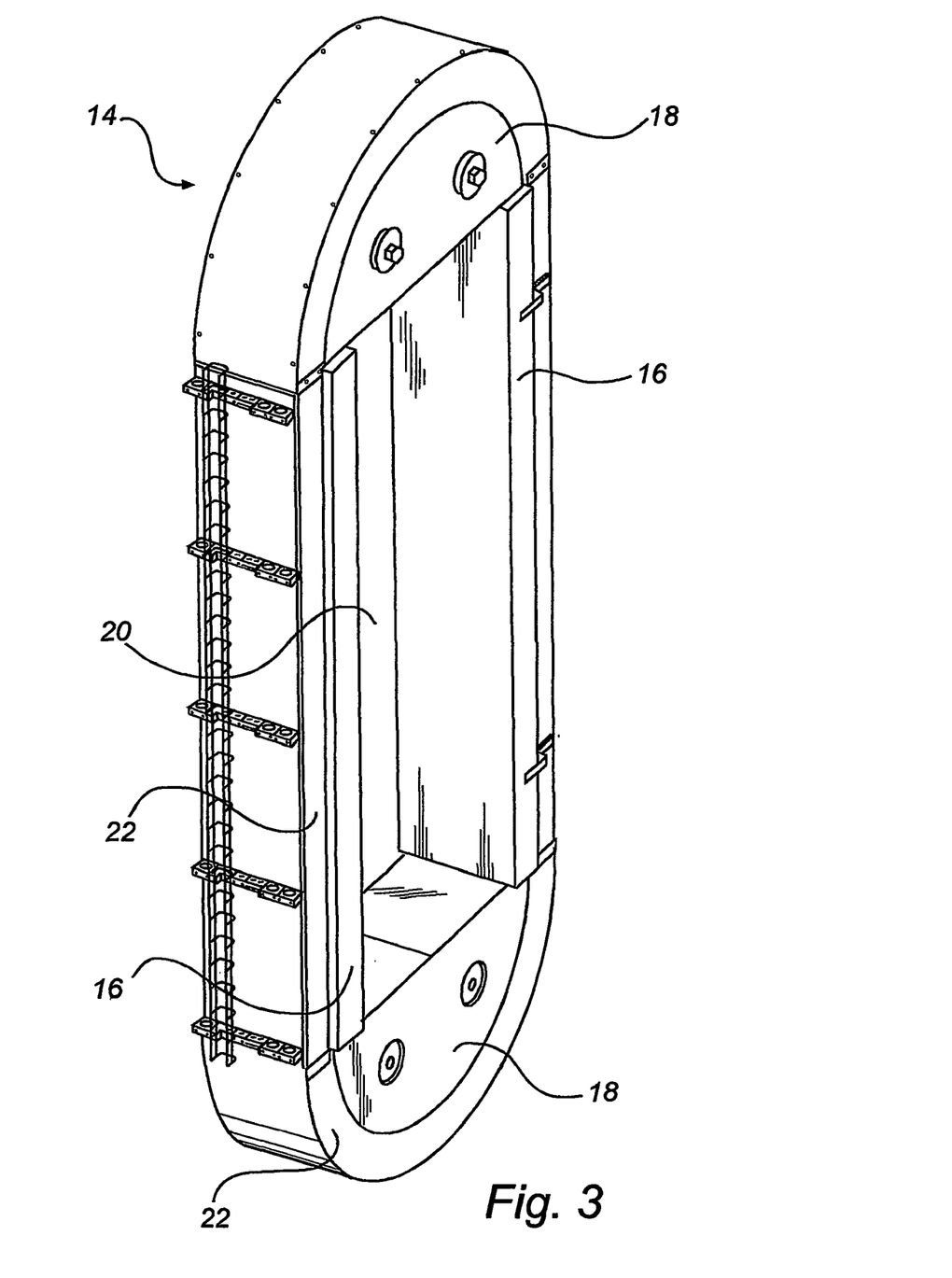
FIG. 3 shows the press frame of the high-pressure press shown in FIG. 1.

The press frame 14 further comprises two solid yokes 18 which each have the form of a semicircular surface. The yokes 18 are arranged at one end each of the pressure cylinder 12 and form together with the columns 16 an internal rectangular space 20 in which the pressure cylinder 12 is housed. The columns 16 and the yokes 18 are wound with wire 22 in several layers in order to provide prestress in the construction, whereby the service length is prolonged. The winding 22 is farthest out provided with a covering plate. A typical high-pressure press 10 of this type is known under the trademark QUINTUS®.

In accordance with the present invention, a device 24 for measuring pressure of the high-pressure press 10 is arranged on the outside of the press frame 14. FIG. 1 and FIG. 2 show that the device 24 comprises a rod-shaped member 26 which extends along and is substantially of the same length as one of the columns 16. The rod-shaped member 26 is kept in position by means of hooks 28 which hold at least certain portions of the rod-shaped member 26 in abutment with the column 16. The rod-shaped member 26 is at its lower portion 30 arranged adjacent to the column 16 in such a manner that the lower end of the rod-shaped member 26 follows the lower end of the column 16, i.e. the distance between these ends is constant. However, the upper portion 32 of the rod-shaped member 26 is freely movable relative to the column 16, which means that the distance in the vertical direction between the upper end of the rod-shaped member 26 and the upper end of the column 16 is variable. The rod-shaped member 26 is at its upper portion 32 provided with detection structure 34. When the pressure increases inside the pressure cylinder 12, the column 16 will be exposed to a change in length. The column 16 will be longer, which means that the distance in the vertical direction between the upper end of the rod-shaped member 26 and the upper end of the column 16 will be changed. Since the detection structure 34 is arranged at the upper end of the rod-shaped member 26, it will detect the change in length which is proportionate to the change in pressure in the pressure cylinder 12.

Figures 4, 5:
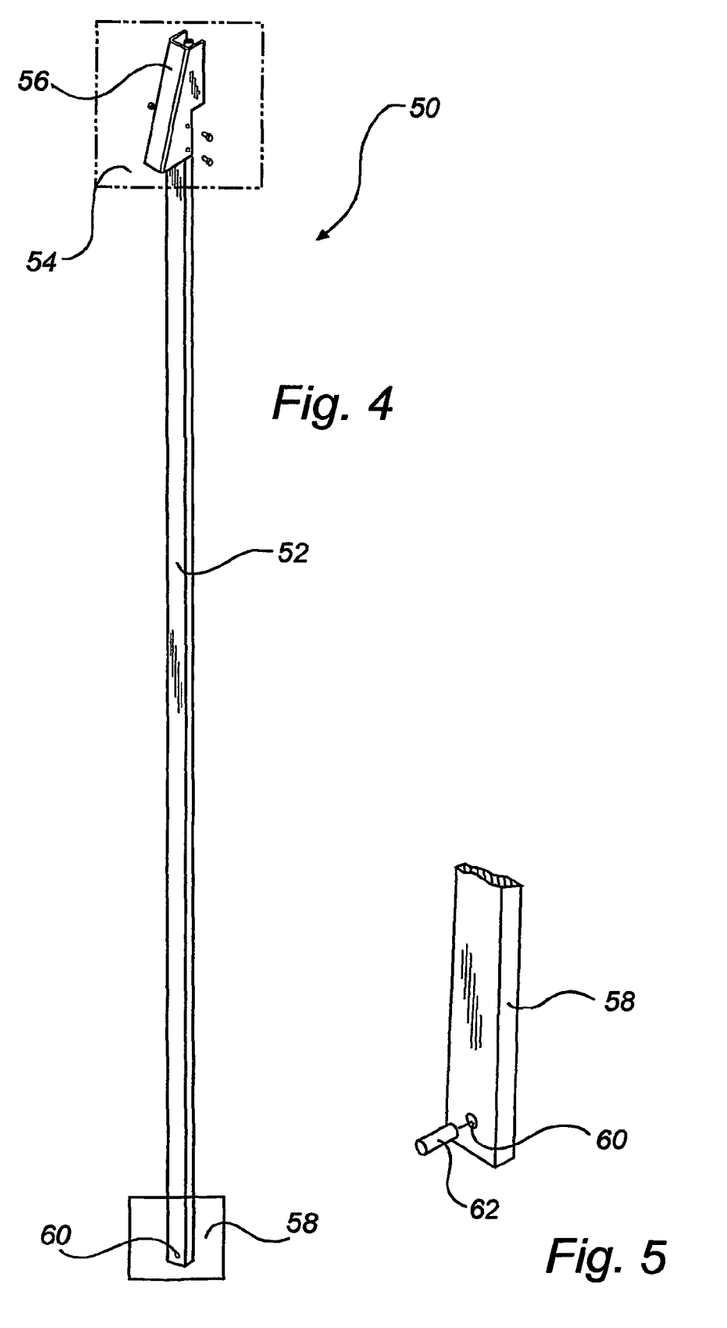
FIG. 4 shows a device to be arranged on a press frame according to an advantageous embodiment of the present invention.
FIG. 5 is an enlargement of a second portion of the device shown in FIG. 4.

FIG. 4 shows a device 50 for arrangement on a press frame according to an advantageous embodiment of the present invention. The device 50 comprises an elongate rod-shaped member 52 which has the shape of a narrow right parallelepiped. The rod-shaped member 52 is about 3 m and is made of steel. The rod-shaped member is at an upper end portion 54 provided with detection structure (not shown) which is surrounded by a protective hood 56.

FIG. 5 is an enlargement of a lower end portion 58 of the device shown in FIG. 4. The lower end portion is provided with a through hole 60. A pin 62 which is longer than the thickness of the rod-shaped member is insertable through the hole, its function being explained in more detail in the description of FIG. 8 and FIG. 9.

Figures 6, 7:
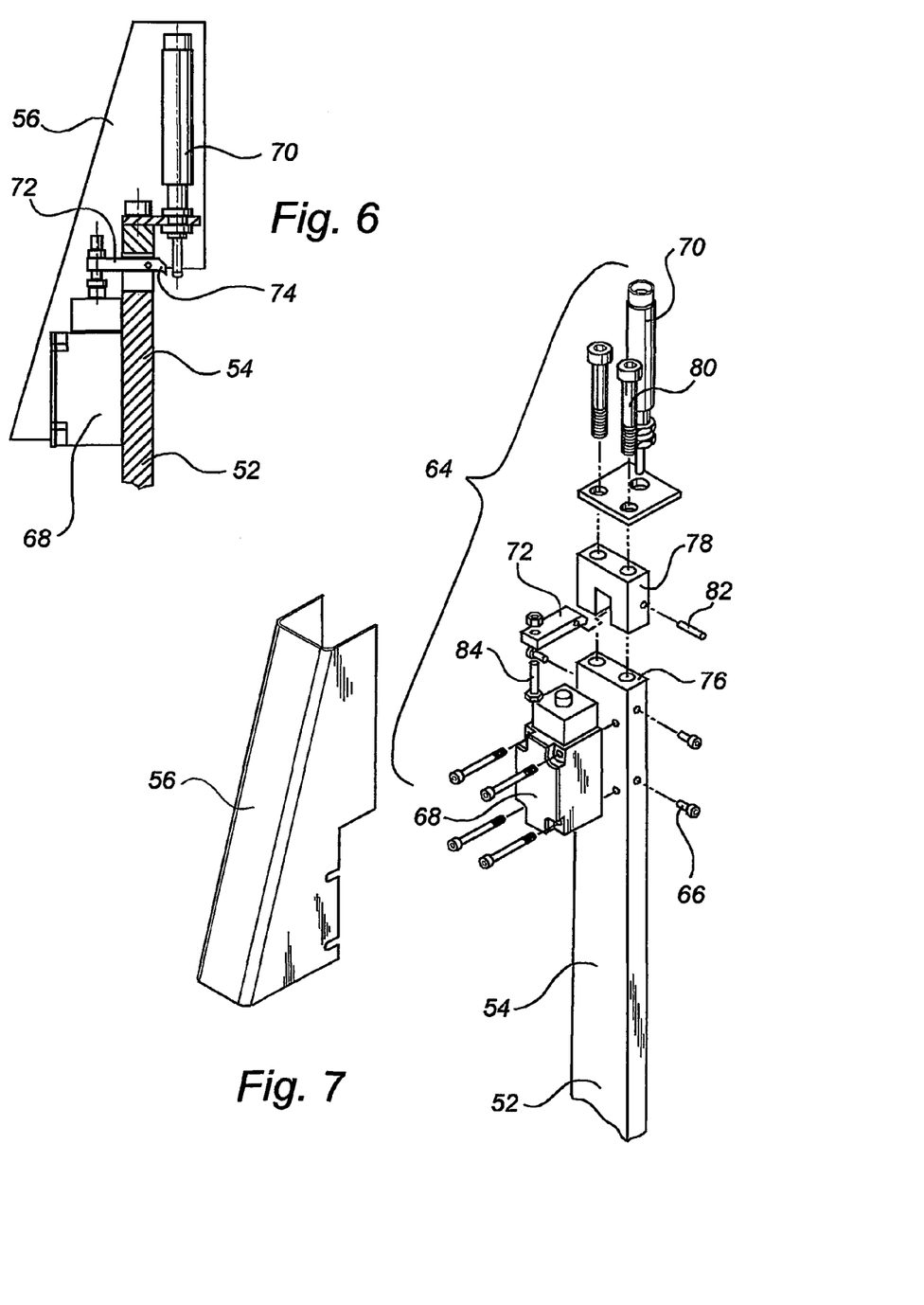
FIG. 6 is a longitudinal cross-section of a first portion of the device shown in FIG. 4.
FIG. 7 is an exploded view of a first portion of the device shown in FIG. 4.

FIG. 6 is a longitudinal cross-sectional view of the upper end portion 54 of the rod-shaped member 52 shown in FIG. 4, which end portion is provided with detection structure 64. FIG. 7 is an exploded view of the same portion 54. Thus, the upper portion 54 of the rod-shaped member 52 is shown, which is provided with detection structure 64 which are protected by a hood 56 that is attached to the rod-shaped member 52 by means of screws 66. The detection structure 64 comprise a limit switch 68 and a length sensor 70.

The limit switch 68 comprises an arm 72 having an end 74 which protrudes downwards and which is adapted to make contact with a column, the change in length of which is to be detected. The arm 72 is positioned above the end surface 76 of the rod-shaped member and is kept in position by means of a hook-shaped attachment 78, which attachment 78 is secured to the rod-shaped member with the aid of screws 80 which enter the rod-shaped member 52 via the end surface 76. A pin 82 which forms the rotational axis of the arm 72 extends right through the attachment 78 and the arm 72. When a column thus gets in contact with the end 74 of the arm 72 and pushes it upwards, the arm 72 will pivot round the pin 82, whereby a reinforced deflection is obtained at the second end of the arm since the pin 82 is placed nearer the first end. This lever or arm 72 exchanges the movement at the limit position about three times, whereby satisfactory accuracy is obtained. An adjusting screw 84 is arranged under the second end of the arm 72 and locked by a lock nut. Adjustment of the interrupting pressure of the system is adjusted by the adjusting screw 84 which is arranged on the arm 72. After adjustment, the adjusting screw 84 is sealed. When the limit position has been achieved, the arm 72 thus pushes down the adjusting screw 84 which, in its turn, affects two contacts that break normal position signals and that are connected to safety relays which, on the one hand, stop the main motor of the pump arrangement so that further pressure accumulation in the pressure vessel is avoided and, on the other, break feeding to the release valve, thereby decompressing the press.

The length sensor 70, which is analogue, comprises a current supplied electromagnetic coil (not shown in detail) in which an elongate iron core 71 is movable. The length sensor 70 is inserted through and screwed to a plate 81. The plate 81, in its turn, is kept in position by the same screws 80 that lock the hook-shaped attachment 78. The iron core 71 extends downwards and is adapted to be in contact all the time with that column 16 on which measuring of changes in length is made. During a pressing operation, the column 16 becomes longer and therefore pushes the iron core 71 upwards, which results in its position relative to the coil being changed and, thus, also the electromagnetic field strength which is detectable therefrom is changed.

It should be noted that the lower end of the length sensor 70, i.e. the lower end of the iron core 71, is at least initially located below the downwardly extending end 74 of the arm 72 of the limit switch 68. The reason for this is that the length sensor 70 continuously is to measure the change in length of the column 16, whereas the limit switch 68 only is to detect if a highest permissible limit is reached in order to directly be able to interrupt the pressing operation and release the pressure from the press. The analogue length sensor 70 gives an output signal of 0-10 V which is received by an analogue input module in the control system, which via a limit position mechanical relay switches a safety relay in the case a predetermined limit value of the output signal is obtained. This relay then interrupts the feeding to the hydraulic pump. In addition, all the safety relays are adapted so that when necessary they disconnect the main engine of the hydraulic system.

Figure 8:
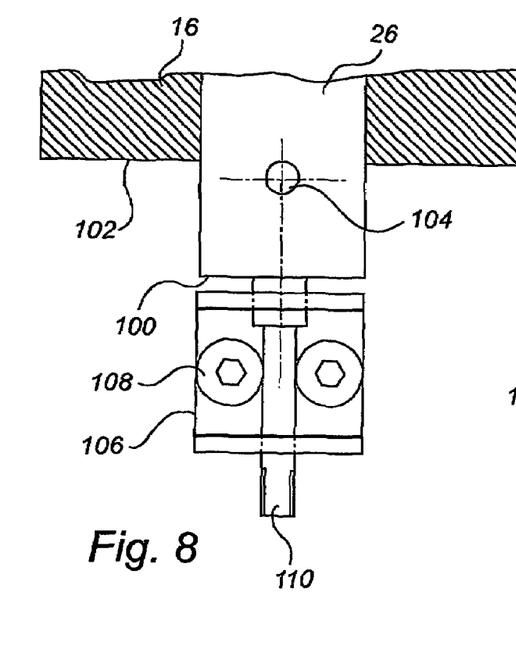
FIG. 8 is an enlargement of the lowermost portion of the device in FIG. 1.
Figure 9:
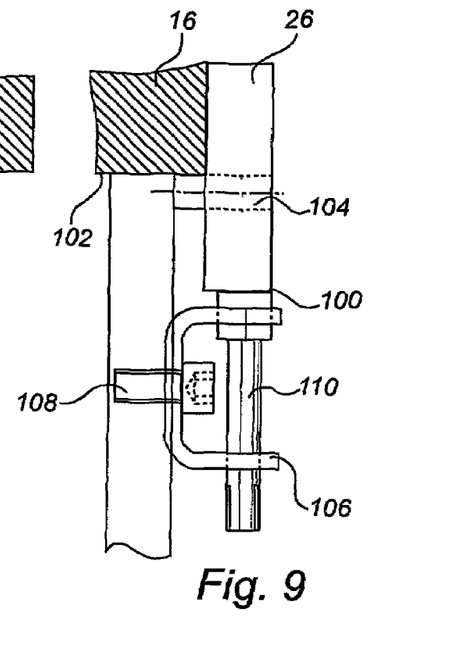
FIG. 9 is a cross-sectional view of the-portion of the device shown in FIG. 8.

FIG. 8 shows an enlargement of the lowermost portion 58 of the device 50 in FIG. 4 and FIG. 5. FIG. 9 is a cross-sectional view of the portion of the device shown in FIG. 8. These Figures show that lower edge 100 of the rod-shaped member 52 is located below the lower edge 102 of the column 16. The horizontally arranged pin 62 is inserted through the hole 60 provided in the rod-shaped member 52. The pin 62 abuts against the underside 102 of the column 16. A spring construction 106 is by means of screws 108 attached to the lower yoke of the press frame or a fixed component arranged outside the lower yoke. The spring construction 106 comprises a spring-loaded pin 110 which has a vertical extension and which presses the rod-shaped member 26 upwards, the pin 62 passed through the rod-shaped member 52 being pressed against the column 16. Consequently, the pin 62 will abut against the column 16 both during a pressing operation in progress and when the press is unloaded and therefore the respective lower ends (100 and 102, respectively) or "zero point" of the rod-shaped member 52 and the column 16 will be located at a constant relative distance.

Figure 10:
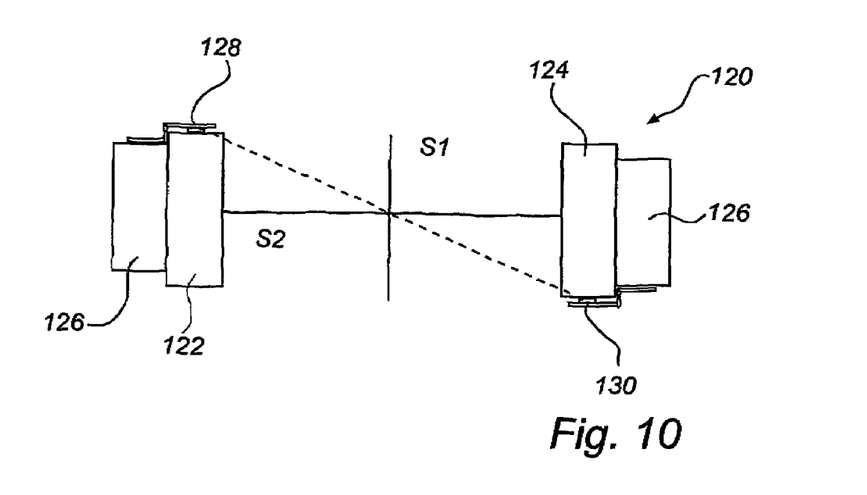
FIG. 10 is a cross-sectional top view of a high-pressure press of the type shown in FIG. 1.

FIG. 10 is a cross-sectional top view of a high-pressure press 120 of the type shown in FIG. 1. FIG. 10 thus shows a first column 122 and a second column 124. The columns 122, 124 are wound with wire. It is evident from FIG. 10 that the layers of wire 126 which are formed by winding and which are applied round the press frame are substantially of the same thickness as a column 122,124. However, the columns 122, 124 have a larger width than said layers of wire 126. This view shows that not only a rod-shaped member 128 with associated detection structure is arranged on a column 122 comprised in the press frame, but also a second rod-shaped member 130 with associated detection structure is arranged on the second column 124 comprised in the press frame. An imaginary line (shown by a dashed line) between the two rod-shaped members apparently runs diagonally relative to the axis S1 or S2 perpendicular the columns.

The arrangement having two diagonally arranged rod-shaped members 128, 130 with associated detection structure shown in FIG. 10 can be used for measuring an average value of the change in length, which gives an accurate representation of the pressure in the high-pressure press 120. Furthermore, it is possible to control that the press frame becomes symmetrically loaded. The difference in change in length between the columns 122, 124 can thus be used for measuring eccentric loads on the press frame. If a maximum permissible lengthening is exceeded for one of the columns, the detection structure of that column will react, whereby the press is shut down in an emergency. Of course, further rod-shaped members can be arranged adjacent to the columns, such as another two. However, it has been found that the existing play sideways between the press frame and the pressure cylinder is so small that eccentric loads in this plane can be disregarded.

Although certain embodiments have been described above, the invention is not limited thereto. It should thus be understood that a plurality of modifications and variations can be provided without deviating from the scope of the present invention which is defined in the appended claims.

The invention claimed is:

1. A high-pressure press, comprising:
    a pressure vessel;
    a force-absorbing press frame surrounding the pressure vessel, and including a column; and
    a detector for detecting changes in length of the column of the press frame, the changes in length depending on a pressure inside the pressure vessel;
    wherein said detector includes a limit switch adapted to detect whether the change in length of the column has reached a threshold value corresponding to a pressure inside the pressure vessel, and, if said threshold value has been reached, to interrupt a pressing operation in progress and reduce the pressure inside the pressure vessel.

2. The high-pressure press as claimed in claim 1 wherein said limit switch comprises an arm that is adapted to make contact with one end of said column, the limit switch being affectable by the column affecting the position of the arm in connection with a change in length.

3. The high-pressure press as claimed in claim 2 wherein the arm is a lever with an end portion adapted to be moved by the column when changing its length in such a manner that the lever pivots on an axis and, thus, with another end portion, performs the interruption of the pressing operation.

4. The high-pressure press as claimed in claim 1, further comprising an unloaded member arranged substantially parallel to and adjacent to said column in such a manner that the position of a first portion of the unloaded member is substantially constant relative to the position of a first portion of the column, and in such a manner that the column is allowed to move freely so that the relative position between a second portion of the unloaded member and a second portion of the column is variable, said detector being adapted to detect the change in length of said column in the form of a changed position of said second portion of the column relative to said second portion of the unloaded member.

5. The high-pressure press as claimed in claim 4 wherein the unloaded member is a rod-shaped member.

6. The high-pressure press as claimed in claim 5 wherein the rod-shaped member is arranged outside of the press frame and on a side of the press frame facing another direction than the side facing the pressure vessel.

7. The high-pressure press as claimed in claim 5 wherein the rod-shaped member is arranged in such a manner that a temperature equalization is provided between said column and the rod-shaped member, for both the column and the rod-shaped member to obtain substantially the same temperature.

8. The high-pressure press as claimed in claim 7 wherein the rod-shaped member, with at least one portion thereof, is adapted to abut against the column for providing said temperature equalization.

9. The high-pressure press as claimed in claim 5 wherein the rod-shaped member is of substantially the same length as the column, and wherein positions of first and second ends of the rod-shaped member substantially correspond to positions of respective first and second ends of the column.

10. The high-pressure press as claimed in claim 5 wherein said detector are arranged at one of the second ends of the rod-shaped member and the column.

11. The high-pressure press as claimed in claim 10 wherein said detector are mounted on said second end of the rod-shaped member in such a manner that the change in length of the column is detected in the form of a changed position of the second end of the column relative to said detector.

12. The high-pressure press as claimed in claim 1 wherein said detector comprises a measuring device, such as a length sensor, for measuring a continuous change in length of the column.

13. The high-pressure press as claimed in claim 5 wherein the rod-shaped member is made of a material which has a coefficient of thermal expansion substantially corresponding to the material of said column, at least in a common longitudinal direction.

14. The high-pressure press as claimed in claim 5 wherein the rod-shaped member has a surface treatment, such as a color treatment, substantially corresponding to that of the column.

15. The high-pressure press as claimed in claim 5 wherein a surface of the rod-shaped member facing the column is substantially planar.

16. The high-pressure press as claimed in claim 5 wherein the force-absorbing press frame is wound with wire that induces a compressing prestress acting in the plane of the press frame, and that is arranged on an outer edge surface of the press frame, the rod-shaped member being arranged at a press frame surface without winding.

17. The high-pressure press as claimed in claim 5, further comprising a device for measuring the pressure in the press by a corresponding further rod-shaped member and detector, the device and further rod-shaped member and detector being adapted to detect if deformation of the press frame is symmetrical or asymmetrical.

18. The high-pressure press as claimed in claim 17 wherein said further rod-shaped member is arranged adjacent to a further column comprised in the press frame in such a manner that the rod-shaped and further rod-shaped members are arranged diagonally relative to a symmetry axis of the high-pressure press which is perpendicular to an extension of the columns.

* * * * *